United States Patent
Purdy

[15] 3,645,481
[45] Feb. 29, 1972

[54] AIRFOIL STRUCTURE
[72] Inventor: Leonard R. Purdy, Oakwood, Ga.
[73] Assignee: Lanier Industries, Inc., Oakwood, Ga.
[22] Filed: Apr. 22, 1970
[21] Appl. No.: 30,735

[52] U.S. Cl............................244/123, 244/132, 244/133
[51] Int. Cl...................................................B64c 3/20
[58] Field of Search................244/123, 126, 117, 119, 133, 244/131, 132, 129

[56] References Cited

UNITED STATES PATENTS

| | | | |
|---|---|---|---|
| 1,874,685 | 8/1932 | Wright | 244/123 |
| 2,161,802 | 6/1939 | De Ganahl | 244/123 |
| 2,562,976 | 8/1951 | Winnick | 244/133 |
| 2,728,702 | 12/1955 | Simon et al. | 244/126 |
| 2,693,922 | 11/1954 | Ellison et al. | 244/123 |
| 3,135,486 | 6/1964 | Wing | 244/123 |
| 3,160,549 | 12/1964 | Caldwell et al. | 244/119 |

*Primary Examiner*—Milton Buchler
*Assistant Examiner*—Steven W. Weinrieb
*Attorney*—Seidel, Gonda & Goldhammer

[57] ABSTRACT

An airfoil structure is disclosed, using a unitary laminated load-bearing skin member, and a rigid internal bracing structure. The skin member includes an outer layer of sheet plastic polymeric material defining the airfoil surface, and an inner rigidifying layer of plastic polymeric foam material bonded to the outer layer.

11 Claims, 5 Drawing Figures

Patented Feb. 29, 1972
3,645,481
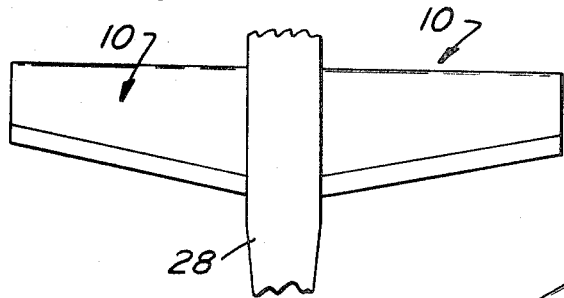
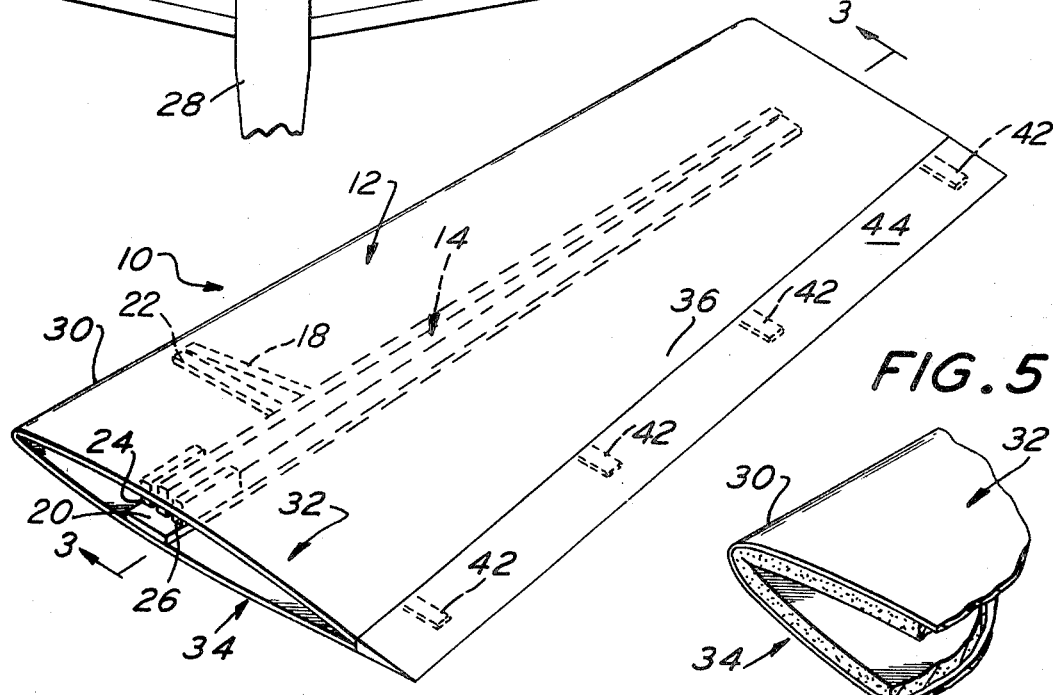
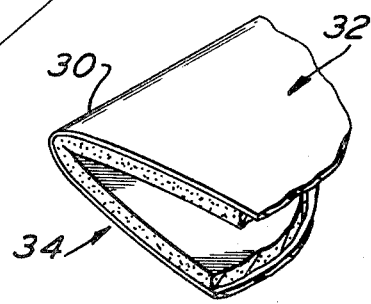
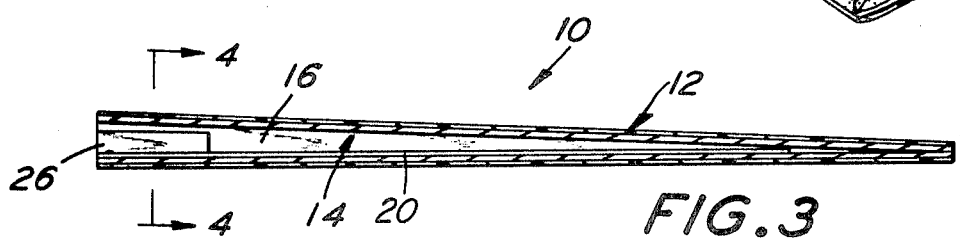
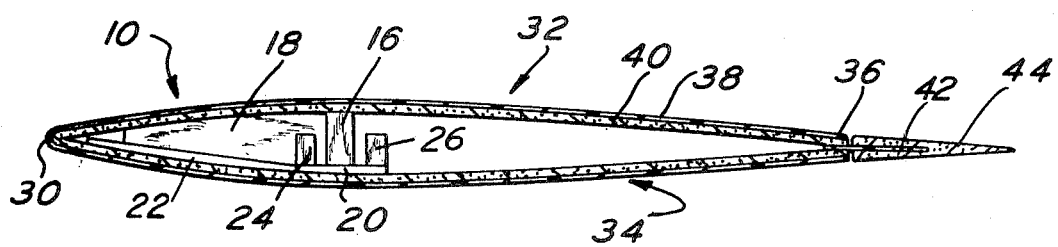
INVENTOR
LEONARD R. PURDY
BY
Seidel, Gonda & Goldhammer
ATTORNEYS

AIRFOIL STRUCTURE

This invention relates to an airfoil structure, and more particularly, to a built-up airfoil structure suitable for use in model aircraft. As used herein, the term "airfoil structure" is intended to have its broadest meaning. Thus, the present airfoil structure may be used to good advantage in major structural components such as wings and stabilizers, as well as in control surfaces such as ailerons, elevators, rudders, flaps and the like.

"Built-up" model aircraft airfoil structures have long been made from a wooden framework of one or more spars, leading and trailing edge members, and ribs, the framework being covered by skin-forming materials such as silk, nylon, silkspan or the like. Recently, plastics have been used to an increasing extent for major structural components. For example, wings have been made from a structural core comprising shaped solid blocks of foamed plastic material, such as foamed polystyrene, covered with a nonload-bearing plastic skin. Such structures have proven reasonably serviceable, but suffer from certain serious shortcomings. For example, when used in thin sections, as is highly desirable in certain types of model aircraft, the foamed core material has little strength in bending. Sections sufficiently thick to provide adequate bending strength tend to be unduly heavy. Moreover, the foamed core material is highly susceptible to dents and nicks due to local impact or even improper handling.

Accordingly, it is an object of this invention to provide a novel airfoil structure, suitable for use in model airplanes, and using plastic components.

It is another object of this invention to provide a novel airfoil structure which is simple to make, and provide adequate strength, even in thin sections.

It is another object of this invention to provide an airfoil structure which is highly resistant to nicks, dents and other superficial surface damage.

Other objects will appear hereinafter.

The foregoing and other objects are realized, in a presently preferred form of the invention, by an airfoil structure using a laminated load-bearing skin member, and minimal internal bracing within the skin member. In the presently preferred form, the skin member comprises an outer layer of sheet plastic polymeric material which defines the airfoil contours, and a backing layer of plastic polymeric foam material bonded to the outer layer.

For the purpose of illustrating the invention, there is shown in the drawings a form which is presently preferred; it being understood, however, that this invention is not limited to the precise arrangements and instrumentalities shown.

FIG. 1 is a partial top plan view of a model airplane using wings constructed in accordance with the principles of this invention.

FIG. 2 is a perspective view, showing a model airplane wing constructed in accordance with the invention.

FIG. 3 is a cross-sectional view, taken along the line 3—3 in FIG. 2.

FIG. 4 is a cross-sectional view, taken along the line 4—4 in FIG. 3.

FIG. 5 is a detail view, showing a portion of the leading edge of an airfoil structure in accordance with the invention.

Referring now to the drawings in detail, wherein like numerals indicate like elements, there is seen in FIGS. 2 through 4 an airfoil structure designated generally by the reference numeral 10. The airfoil structure 10 comprises a laminated load-bearing skin member, designated generally by the reference numeral 12, and a rigid internal bracing structure, designated generally by the reference numeral 14. The bracing structure 14, in the illustrated form of the invention, includes a spar member 16, extending in a generally spanwise direction. One or more ribs, such as the half-rib 18 seen in FIGS. 2 and 4, may be associated with the spar member 16. Associated with the spar member 16 and half-rib 18 in the illustrated embodiment are optional cap strips 20 and 22.

The bracing structure 14, it should be understood, is generally constructed of wood, such as plywood. Other materials might be used, however, if desired.

In the illustrated form of the invention, blocks 24 and 26 are shown in association with the spar member 16 and cap strip 20. Such blocks provide a convenient means for mounting of the airfoil structure 10, or for securement of landing gear or the like, not illustrated, to the airfoil structure. Referring to FIG. 1, for example, airfoil structures 10 serve as wings, and are associated with a fuselage 28.

The skin member 12 is a load-bearing element of the airfoil structure 10. The skin member 12 may be formed from an initially flat laminated blank, doubled at a bend 30 defining the leading edge of the airfoil structure 10. Thus, referring to FIGS. 4 and 5, portions of the skin member 12 on opposite sides of the bend 30 define respective airfoil halves, designated generally by the reference numerals 32 and 34.

The airfoil halves 32 and 34 are bonded together at the trailing edge 36.

The skin member 12 comprises an outer layer 38 of rigid or semirigid sheet plastic polymeric material, and a backing layer 40 of foamed plastic polymeric material, bonded thereto. The backing layer 40 is thicker and less dense than the outer layer 38 and serves to further rigidify the outer layer 38, without unduly adding to the overall weight of the airfoil structure 10. The backing layer 40 makes unnecessary the use of extensive internal bracing structure.

A bracing structure 14 including a single spar 16 and half-rib 18 spaced from the wing root by about one-quarter of the span has proved adequate. Compression of the backing layer 40 at the bend 30 produces a strong, substantially nonyieldable leading edge, which completely obviates the need for any internal leading edge member.

In one practical embodiment of the here-enclosed airfoil structure 10, the outer layer 38 was sheet vinyl, having a nominal thickness of 0.012 inches. The backing layer 40 was of polystyrene foam of about seven sixty-fourths inch thickness. The outer layer 38 and backing 40 were bonded by a pressure-sensitive adhesive. Those skilled in the art will appreciate that other well-known bonding techniques could have been used. For example, the outer layer 38 and backing layer 40 could have been joined by flame bonding or by means of adhesives other than the above-mentioned pressure-sensitive variety.

In the above-described operative embodiment, the bracing structure 14 was joined to the skin member 12 by epoxy adhesive. Also, the airfoil halves 32 and 34 were joined at the trailing edge 36 by epoxy.

Flexible hinge strips 42 may be sandwiched, if desired, between the airfoil halves 32 and 34 at the trailing edge 36. The hinge strips 42 provide a convenient means whereby a control surface, such as the illustrated full-span aileron 44, may be coupled to the airfoil structure 10.

The skin member 12 in the above-described operative embodiment provided an exceedingly smooth airfoil surface. The skin member 12 had considerable resistance to impact damage. Moreover, if deformed locally, the outer layer 38 had a noticeable tendency to return to its former contours after a short period of time.

Those skilled in the art will appreciate that numerous polymeric materials can be used to good advantage in the present airfoil structure 10. In addition to the vinyl chloride polymers and copolymers, styrenes and other like materials available in sheet form may be used.

The present invention may be embodied in other specific forms without departing from the spirit or essential attributes thereof and, accordingly, reference should be made to the appended claims, rather than to the foregoing specification as indicating the scope of the invention.

I claim:

1. An airfoil structure comprising a unitary load-bearing skin member of laminated construction, said skin member being doubled over at a bend to form a hollow structure having respective spaced airfoil halves, said bend defining a leading edge of the airfoil structure, said skin member comprising an outer layer and an inner layer bonded thereto, said outer layer being comprised of a sheet plastic polymeric material defining an airfoil surface, said inner layer comprising a layer of plastic polymeric foam material with portions of said inner layer on opposite sides of said bend being in facing relation to each other, said inner layer being bonded to said outer layer, a rigid bracing structure disposed within said hollow structure, said bracing structure extending between adjacent facing portions of said inner layer, and said bracing structure is bonded to said adjacent facing portions of said inner layer.

2. An airfoil structure comprising a unitary load-bearing skin member of laminated construction, said skin member being doubled over at a bend to form a hollow structure having respective spaced airfoil halves, the bend defining a leading edge of the airfoil structure, said skin member comprising an outer layer of sheet plastic polymeric material defining an outer surface and a continuous backing layer of plastic polymeric foam material bonded to said outer layer, and a rigid bracing structure within said skin member, said bracing structure extending between juxtaposed portions of said backing layer associated with the respective airfoil halves and bonded to said juxtaposed portions of said backing layer.

3. An airfoil structure in accordance with claim 2, wherein said skin member comprises an initially flat blank, and edges of said skin member remote from said bend being joined together to form a trailing edge.

4. An airfoil structure in accordance with claim 3, wherein said bracing structure comprises a spar member extending in a generally spanwise direction between the airfoil halves and maintaining said halves in spaced relation, and at least one rib coupled to said spar member.

5. An airfoil structure in accordance with claim 4, and cap strips associated with said spar members and said rib, said cap strips being interposed between said spar member and said rib and the backing layer.

6. An airfoil structure in accordance with claim 2, wherein said outer layer comprises sheet polyvinyl chloride, and said backing layer comprises foamed polystyrene.

7. An airfoil structure in accordance with claim 2, wherein said skin member comprises an initially flat blank, said backing layer being compressed at said bend to form a substantially rigid leading edge, and edges of said skin member remote from said bend being joined together to form a trailing edge.

8. An airfoil structure in accordance with claim 7, wherein said bracing structure comprises a spar member extending in a generally spanwise direction between the airfoil halves and maintaining said halves in spaced relation.

9. An airfoil structure in accordance with claim 7, wherein said bracing structure comprises a spar member extending in a generally spanwise direction between the airfoil halves to maintain said halves in spaced relation, and at least one rib coupled to said spar member.

10. An airfoil structure in accordance with claim 9, and cap strips associated with said spar member and said rib, said cap strips being interposed between said spar member and rib and the backing layer.

11. An airfoil structure in accordance with claim 7, wherein said outer layer comprises sheet polyvinyl chloride, and said backing layer comprises foamed polystyrene, the outer layer having a thickness of about one-tenth the total thickness of the skin member.

* * * * *